United States Patent
Cooney et al.

(10) Patent No.: US 12,545,427 B2
(45) Date of Patent: Feb. 10, 2026

(54) DUCTED SUPPLEMENTAL POWER UNIT OF AIRCRAFT

(71) Applicant: Hamilton Sundstrand Corporation, Charlotte, NC (US)

(72) Inventors: Robert C. Cooney, Janesville, WI (US); David M. Kucharski, Delavan, WI (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 155 days.

(21) Appl. No.: 18/331,417

(22) Filed: Jun. 8, 2023

(65) Prior Publication Data
US 2024/0409233 A1    Dec. 12, 2024

(51) Int. Cl.
*B64D 41/00* (2006.01)

(52) U.S. Cl.
CPC .................. *B64D 41/007* (2013.01)

(58) Field of Classification Search
CPC .................................................. B64D 41/007
See application file for complete search history.

(56) References Cited

U.S. PATENT DOCUMENTS

| | | | |
|---|---|---|---|
| 2,749,064 A * | 6/1956 | Kuhlman, Jr. ............ | B64D 1/06 89/1.51 |
| 5,505,587 A | 4/1996 | Ghetzler | |
| 6,270,309 B1 | 8/2001 | Ghetzler et al. | |
| 6,729,156 B2 | 5/2004 | Sauterleute et al. | |
| 7,982,328 B2 | 7/2011 | Huntemann | |
| 8,678,310 B2 | 3/2014 | Masoudipour et al. | |
| 9,957,060 B2 | 5/2018 | Riordan | |
| 10,094,336 B2 | 10/2018 | Makowski et al. | |
| 10,704,466 B2 * | 7/2020 | Dierksmeier ............ | F02C 7/14 |
| 2013/0048780 A1 | 2/2013 | Masoudipour et al. | |

FOREIGN PATENT DOCUMENTS

EP    4282765 A1    11/2023

OTHER PUBLICATIONS

European Search Report for Application No. 24180770.0, mailed Oct. 15, 2024, 9 pages.

* cited by examiner

*Primary Examiner* — Richard Green
*Assistant Examiner* — Nevena Aleksic
(74) *Attorney, Agent, or Firm* — CANTOR COLBURN LLP (57) ABSTRACT

A supplemental power generation arrangement for an aircraft includes a duct defined in the aircraft, a ram air turbine located in the duct and driven to rotate about a turbine axis by a ram airflow through the duct. One or more accessory components are operably connected to the ram air turbine. The ram air turbine is configured to provide rotational energy to power the one or more accessory components.

18 Claims, 7 Drawing Sheets

DUCTED SUPPLEMENTAL POWER UNIT OF AIRCRAFT

BACKGROUND

Exemplary embodiments pertain to the art of emergency power units for aircraft.

Aircraft may include power generation using turbines in main engines. However, as a safety feature, or for other reasons, alternate power device (e.g., supplementary or backup units) may be arranged on aircraft to supply power (e.g., electric and/or hydraulic) to components of the aircraft, when needed. For example, a ram air turbine (RAT) is typically stowed in the aircraft wing or fuselage, and is selectably deployable, often via a spring, into the airstream to generate power when sufficient primary power generation is not available. The ram air turbine typically includes a turbine that is deployed into an airstream along (e.g., external to) the aircraft. Rotation of the turbine drives a generator and/or hydraulic pump. The generator and/or hydraulic pump can be mounted at a pivot point of the ram air turbine that is a distance from the turbine deployed within the airstream.

To reduce the volume required to stow the RAT in the wing or the fuselage, the turbine typically has only two blades, which are aligned with a main axis of the arm when the RAT is stowed. Securing the RAT in its stowage location is dangerous due to the high spring forces which are overcome to move the RAT into its stowed location. Additionally, at high aircraft speeds when the RAT is deployed, the force of air moving over the RAT blades can overcome the spring force and move the RAT closer to the aircraft structure, which may damage the aircraft structure and/or the RAT.

BRIEF DESCRIPTION

In one embodiment, a supplemental power generation arrangement for an aircraft includes a duct defined in the aircraft, a ram air turbine located in the duct and configured to rotate about a turbine axis by a ram airflow through the duct. One or more accessory components are operably connected to the ram air turbine. The ram air turbine is configured to provide rotational energy to power the one or more accessory components.

Additionally or alternatively, in this or other embodiments a door extends across a duct inlet of the duct. The door is selectably movable between a closed position and an open position to control the ram airflow entering the duct.

Additionally or alternatively, in this or other embodiments an electric latch is configured such that a loss of electrical power to the latch allows the door to move from the closed position to the open position.

Additionally or alternatively, in this or other embodiments the duct includes one or more of a converging inlet duct located upstream of the ram air turbine, and a diverging outlet duct located downstream of the ram air turbine.

Additionally or alternatively, in this or other embodiments one or more baffles are located in the duct to throttle the ram airflow in the duct.

Additionally or alternatively, in this or other embodiments the duct includes two or more duct legs arranged in a fluidly parallel arrangement, and a common inlet duct fluidly connected to and located upstream of the two or more duct legs. The ram air turbine is located in a first duct leg of the two or more duct legs.

Additionally or alternatively, in this or other embodiments a door extends across a duct inlet of the first duct leg. The door is selectably movable between a closed position and an open position to control the ram airflow entering the first duct leg.

Additionally or alternatively, in this or other embodiments an additional ram air driven device is located in a second duct leg of the two or more duct legs.

Additionally or alternatively, in this or other embodiments a common outlet duct is fluidly connected to and located downstream of the two or more duct legs.

Additionally or alternatively, in this or other embodiments an additional ram air driven device is located in the common outlet duct.

Additionally or alternatively, in this or other embodiments the one or more accessory components includes one or more of an electrical generator, a hydraulic pump or a hybrid pump.

In another embodiment, an aircraft includes an aircraft body, one or more engines to drive flight and power the aircraft, and a supplemental power generation system. The supplemental power generation system includes a duct defined in the aircraft, a ram air turbine located in the duct and configured to rotate about a turbine axis by a ram airflow through the duct, and one or more accessory components operably connected to the ram air turbine. The ram air turbine is configured to provide rotational energy to power the one or more accessory components.

Additionally or alternatively, in this or other embodiments a door extends across a duct inlet of the duct. The door is selectably movable between a closed position and an open position to control the ram airflow entering the duct.

Additionally or alternatively, in this or other embodiments an electric latch is configured such that a loss of electrical power to the latch allows the door to move from the closed position to the open position.

Additionally or alternatively, in this or other embodiments the duct includes one or more of a converging inlet duct located upstream of the ram air turbine, and a diverging outlet duct located downstream of the ram air turbine.

Additionally or alternatively, in this or other embodiments one or more baffles are located in the duct to throttle the ram airflow in the duct.

Additionally or alternatively, in this or other embodiments the duct includes two or more duct legs positioned in a fluidly parallel arrangement, and a common inlet duct fluidly connected to and located upstream of the two or more duct legs. The ram air turbine is positioned in a first duct leg of the two or more duct legs.

Additionally or alternatively, in this or other embodiments an additional ram air driven device is positioned in a second duct leg of the two or more duct legs.

Additionally or alternatively, in this or other embodiments a common outlet duct is fluidly connected to and located downstream of the two or more duct legs.

Additionally or alternatively, in this or other embodiments an additional ram air driven device is located in the common outlet duct.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
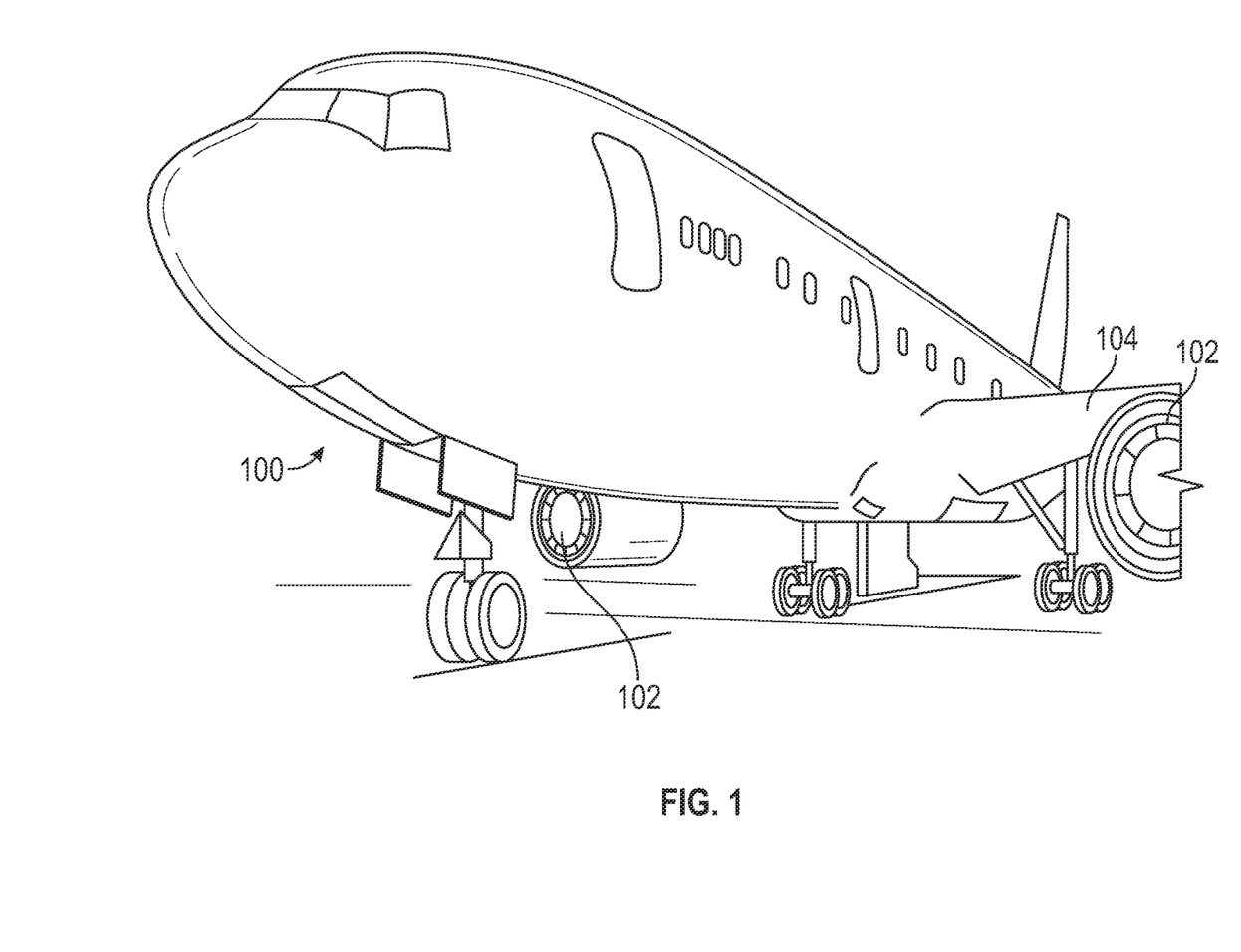
FIG. 1 is a perspective view of an embodiment of an aircraft.

As shown in FIG. 1, an aircraft 100 typically includes one or more engines 102 for driving flight and powering the aircraft. The engines 102 are typically mounted on wings 104 of the aircraft 100, but may be located at other locations depending on the specific aircraft configuration. In some aircraft, the engine(s) may be tail mounted, or housed within the body of the aircraft, or otherwise arranged as will be appreciated by those of skill in the art.

Each engine 102 of the aircraft 100, regardless of location, may include one or more attached or connected generators, as appreciated by those of skill in the art. The generators may provide electrical power to various components of aircraft, as will be appreciated by those of skill in the art. In some configurations, the generators may be operably connected to an output shaft of the engine which drives a stator/rotor to generate electricity. In other configurations, a shaft from the engine may interface to a gearbox, and generators may be mounted, as an accessory, to the gearbox.

In addition to the power generated by the traditional or main engines (i.e., engines 102), additional power generation systems may be arranged on an aircraft. One type of such alternative, backup, or supplemental power generation may be a ram air turbine. The ram air turbine may be located in a nose portion of the aircraft, or at some other location such as along the lower fuselage or belly of the aircraft, as will be appreciated by those of skill in the art (e.g., wing, wing-to-body fairing, etc.).

Figure 2:
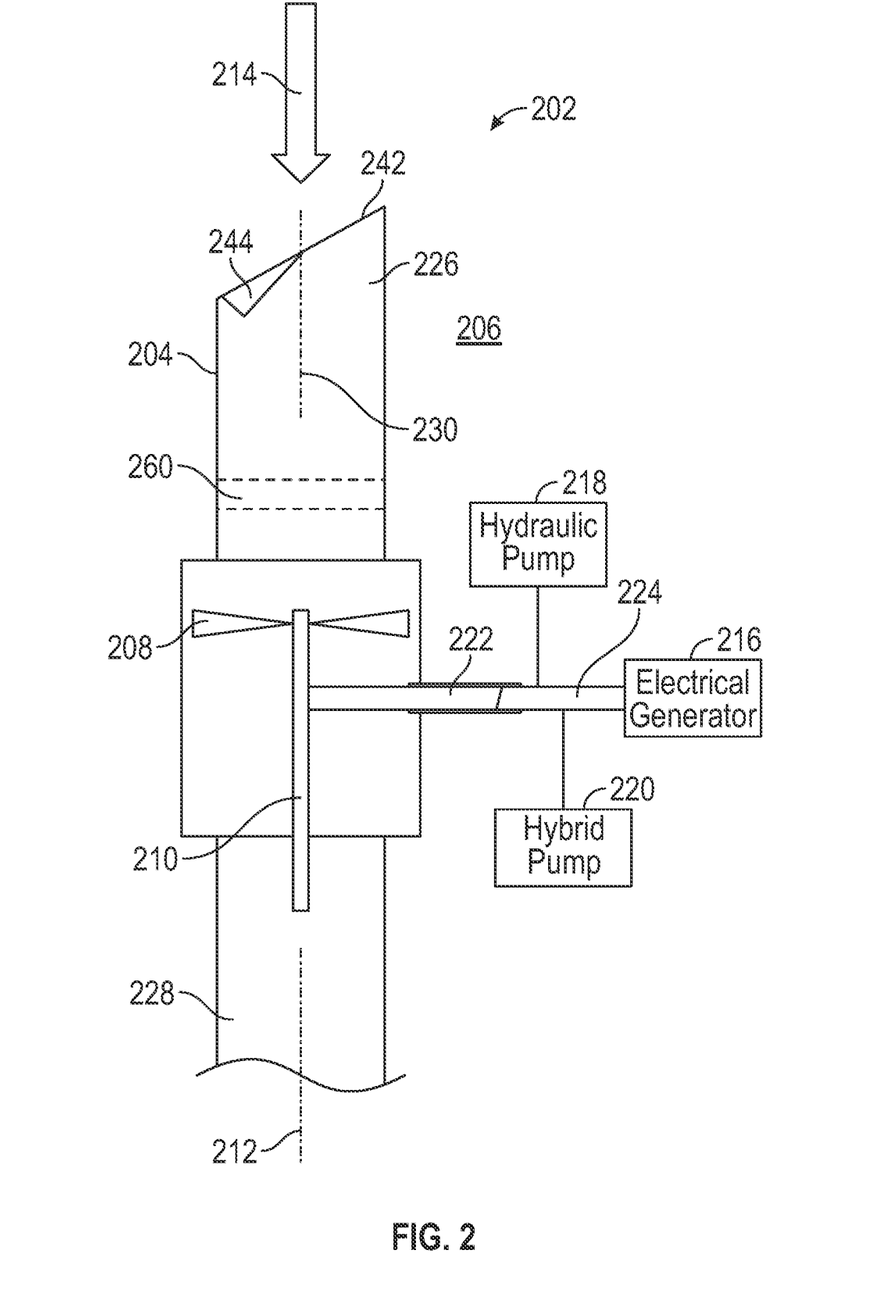
FIG. 2 is a schematic illustration of an embodiment of a ducted supplemental power unit having a door in a closed position.

Referring now to FIG. 2, illustrated is an exemplary embodiment of a ram air turbine 202 arrangement. The ram air turbine 202 is positioned in a duct 204 defined in, for example a fuselage 206 or body of the aircraft 100. One skilled in the art will readily appreciate that the duct 204 may alternatively be defined in, for example, a wing or wing-to-body fairing of the aircraft 100. The ram air turbine 202 includes a plurality of turbine blades 208, for example, two, four or five turbine blades 208 arranged on a turbine shaft 210. The turbine blades 208 are driven to rotate the turbine shaft 210 about a turbine axis 212 by a RAM airflow 214 through the duct 204. The turbine shaft 210 is operably connected to one or more accessory components, such as an electrical generator 216, hydraulic pump 218 and/or a hybrid pump 220. In some embodiments, the turbine shaft 210 is operably connected to the one or more accessory components by a take-off shaft 222. The arrangement may further include a transmission 224 to distribute rotational energy to the accessory components. In some embodiments, one or more baffles 260 are located in the duct 204 upstream of the ram air turbine 202. While in the illustrated embodiment the one or more baffles 260 are located upstream of the ram air turbine 202, in other embodiments the one or more baffles are located in the duct 204 downstream of the ram air turbine 202. The one or more baffles 260 act to throttle the speed of the ram airflow 214, allowing for power generation at high airspeeds.

Figure 3:
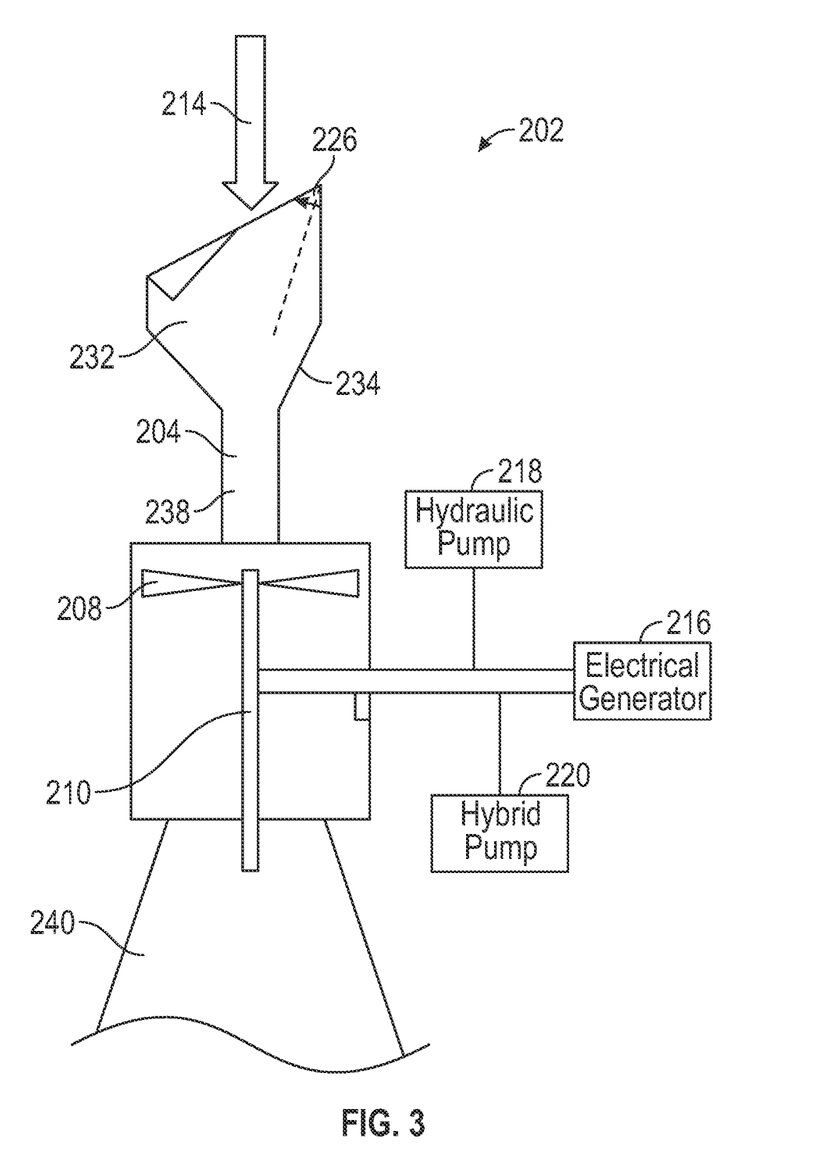
FIG. 3 is a schematic illustration of an embodiment of a ducted supplemental power unit with a converging/diverging duct.

The duct 204 includes a duct inlet 226 through which the RAM airflow 214 enters the duct 204, and a duct outlet 228 through which the RAM airflow 214 is expelled from the duct 204 after passing through the ram air turbine 202. In the embodiment illustrated in FIG. 2, the duct 204 extends substantially linearly along a duct axis 230. It is to be appreciated, however, that this embodiment is merely exemplary, and that the duct 204 may extend curvilinearly and/or a combination of linearly and curvilinearly in order to be packaged into a selected volume, and to provide the desired flow characteristics of the RAM airflow 214 through the duct 204. Further, while in the embodiment of FIG. 2, the duct 204 has a constant cross-sectional area, one skilled in the art will readily appreciate that the cross-sectional area may be varied to provide desired flow characteristics of the RAM airflow 214 through the duct 204. For example, in the embodiment of FIG. 3, an exemplary embodiment for relatively low-speed aircraft is illustrated. The duct 204 includes an inlet duct 232 having a first cross-sectional area and includes a converging portion 234 in which the cross-sectional area decreases to connect the inlet duct 232 to a throat portion 238 at which the ram air turbine 202 is positioned. A diverging nozzle outlet duct 240 is located downstream of the ram air turbine 202. This converging/diverging configuration of duct 204 accelerates the RAM airflow 214 to improve the power generation capability of the ram air turbine 202 at low speed aircraft operation.

Figure 4:
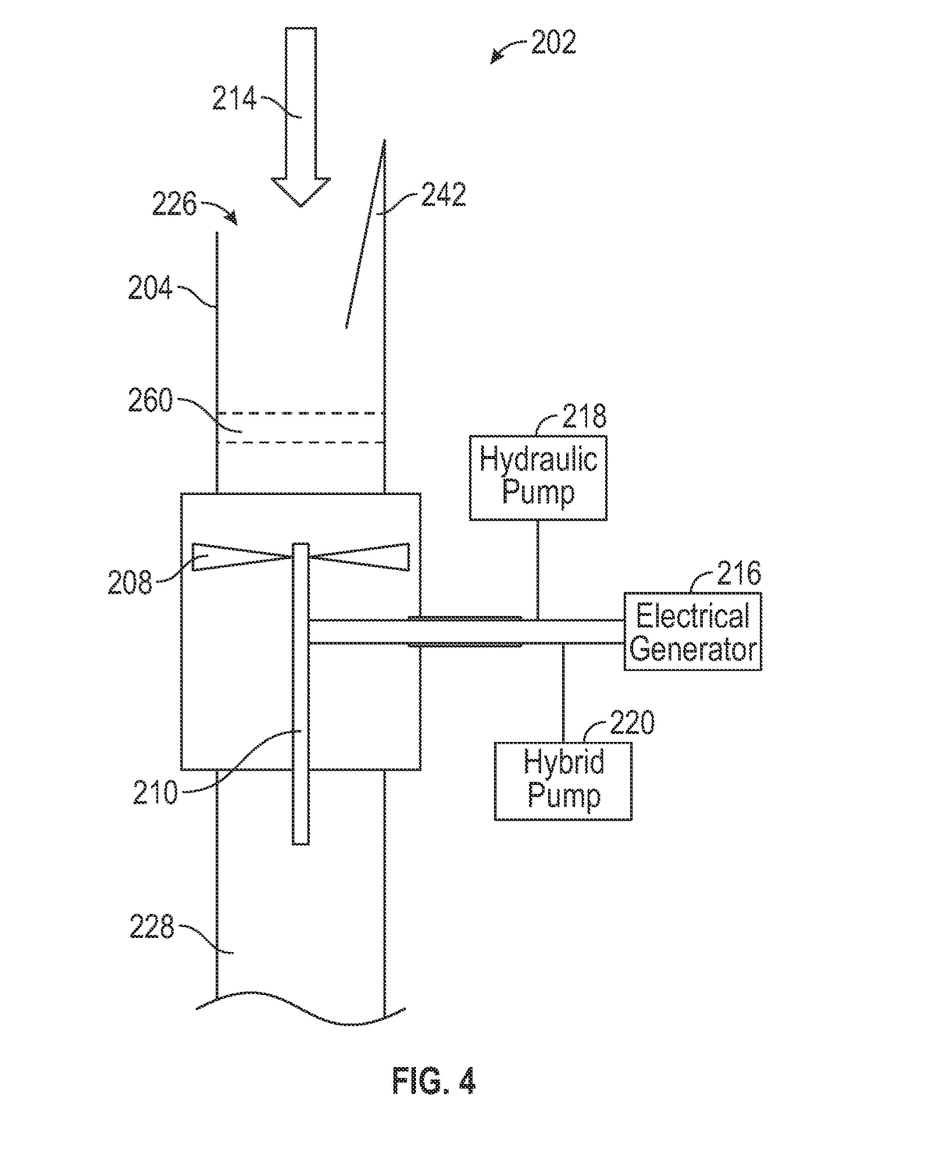
FIG. 4 is a schematic illustration of an embodiment of a ducted supplemental power unit having a door in an open position.

Referring again to FIG. 2, a door 242 is located at the duct inlet 226, and during normal operation of the aircraft 100 is secured in a closed position by a latch 244. In some embodiments, the latch 244 is an electric latch such that when electrical power is lost or is reduced below a threshold the latch 244 is disengaged and the door 242 moves to the open position by the force of airflow on the door 242 by the forward motion of the aircraft 100, such as in FIG. 4. When the door 242 is in the opened position, the RAM airflow 214 drives operation of the ram air turbine 202.

Figure 5:
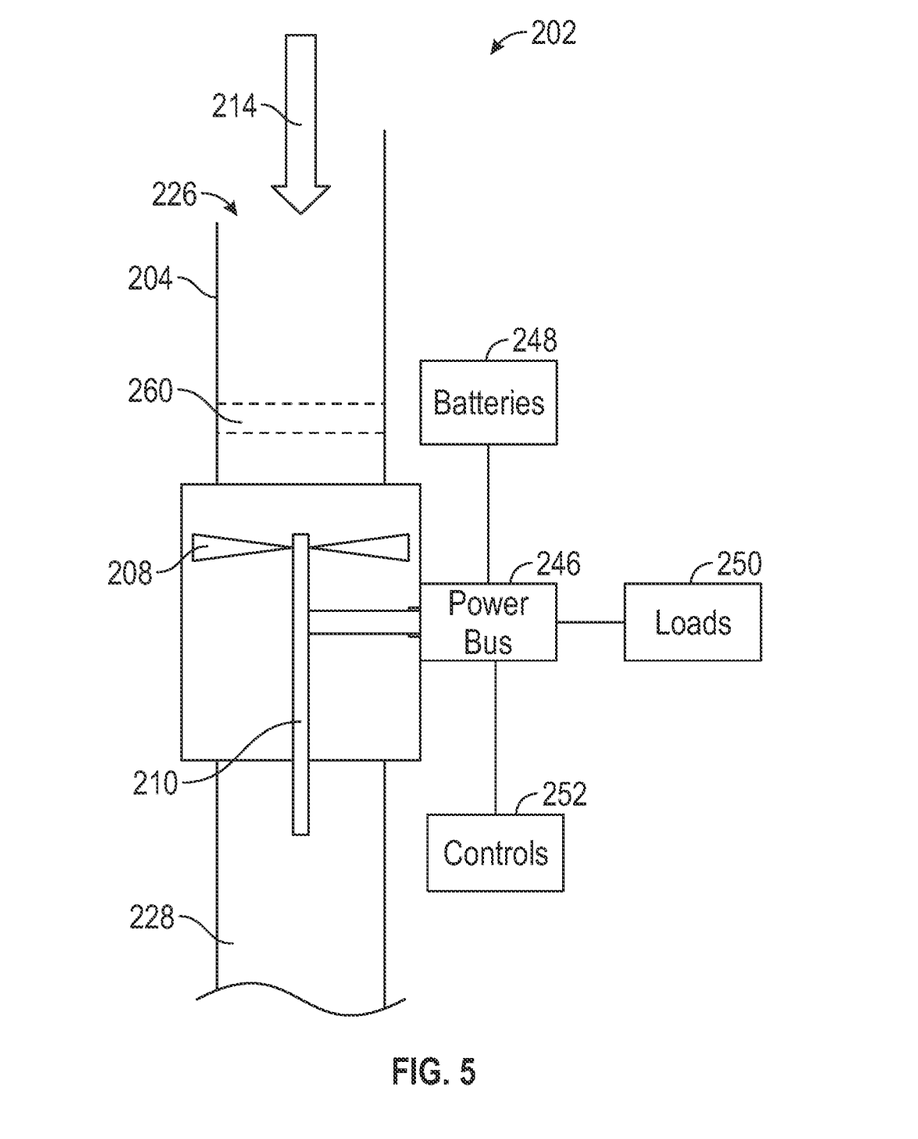
FIG. 5 is a schematic illustration of an embodiment of a ducted supplemental power unit absent a door.

Referring now to FIG. 5, in some embodiments the door 232 is absent from the duct 204 such that the RAM airflow 214 flows continuously through the duct 204. In this case, the rotational energy from the ram air turbine 202 is utilized to create a supplemental power bus 246. The supplemental power bus 246 is utilized to, for example, charge onboard batteries 248, provide backup power to flight instruments and/or loads 250, or to provide power to fly by wire controls 252.

Figure 6:
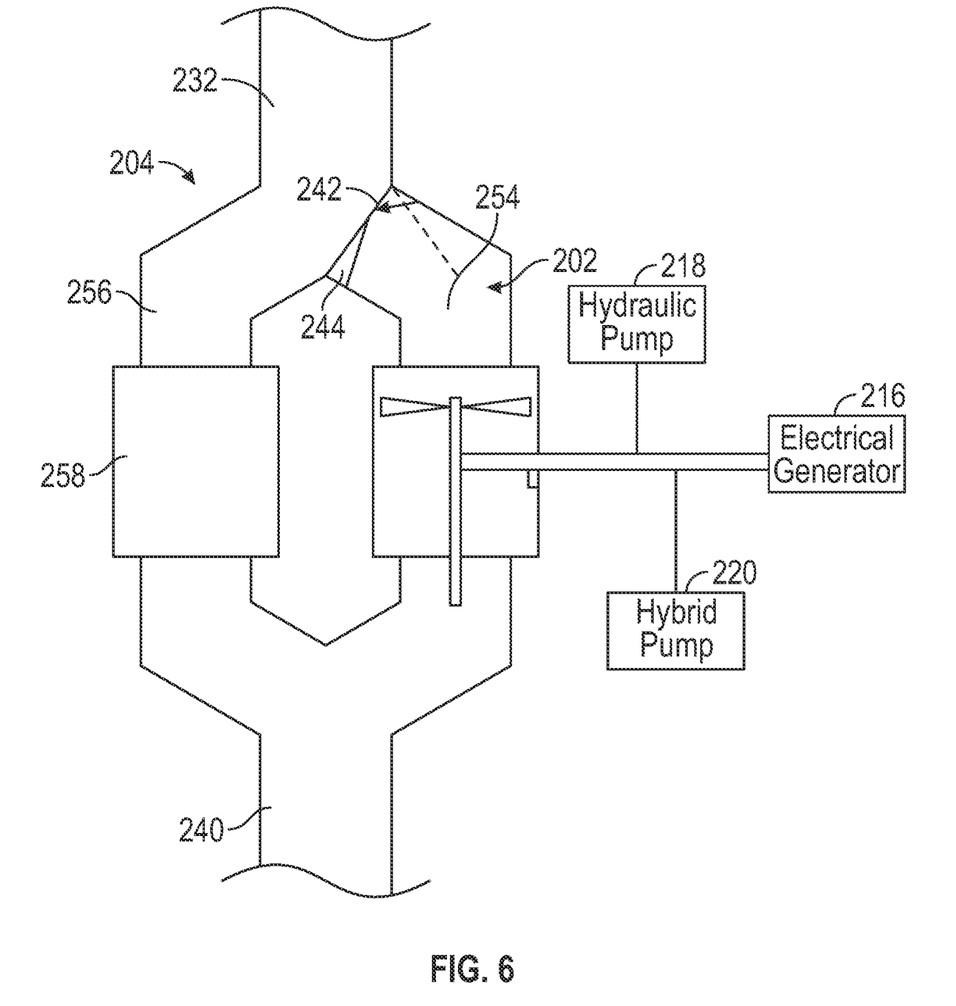
FIG. 6 is a schematic illustration of an embodiment of a ducted supplemental power unit having multiple duct legs.

Another exemplary embodiment is illustrated in FIG. 6. In this embodiment, the duct 204 includes a first duct leg 254 and a second duct leg 256 arranged in a fluidly parallel relationship, and which share an inlet duct 232 and a common outlet duct 240. The ram air turbine 202 is disposed in the first duct leg 254. The turbine blades 208 are driven to rotate the turbine shaft 210 about the turbine axis 212 by the RAM airflow 214 through the duct 204. The turbine shaft 210 is operably connected to one or more accessory components. In some embodiments, a door 242 and latch 244 is disposed at the duct inlet 226 of the first duct leg 254 to control RAM airflow 214 through the first duct leg 254 and across the ram air turbine 202. An additional ram air device 258, such as inlet air utilized to cool heat exchangers or to pressurize the aircraft cabin, is located in the second duct leg 256. While not illustrated in FIG. 6, a door 242 and latch 244 may also be disposed at the second duct leg 256.

Figure 7:
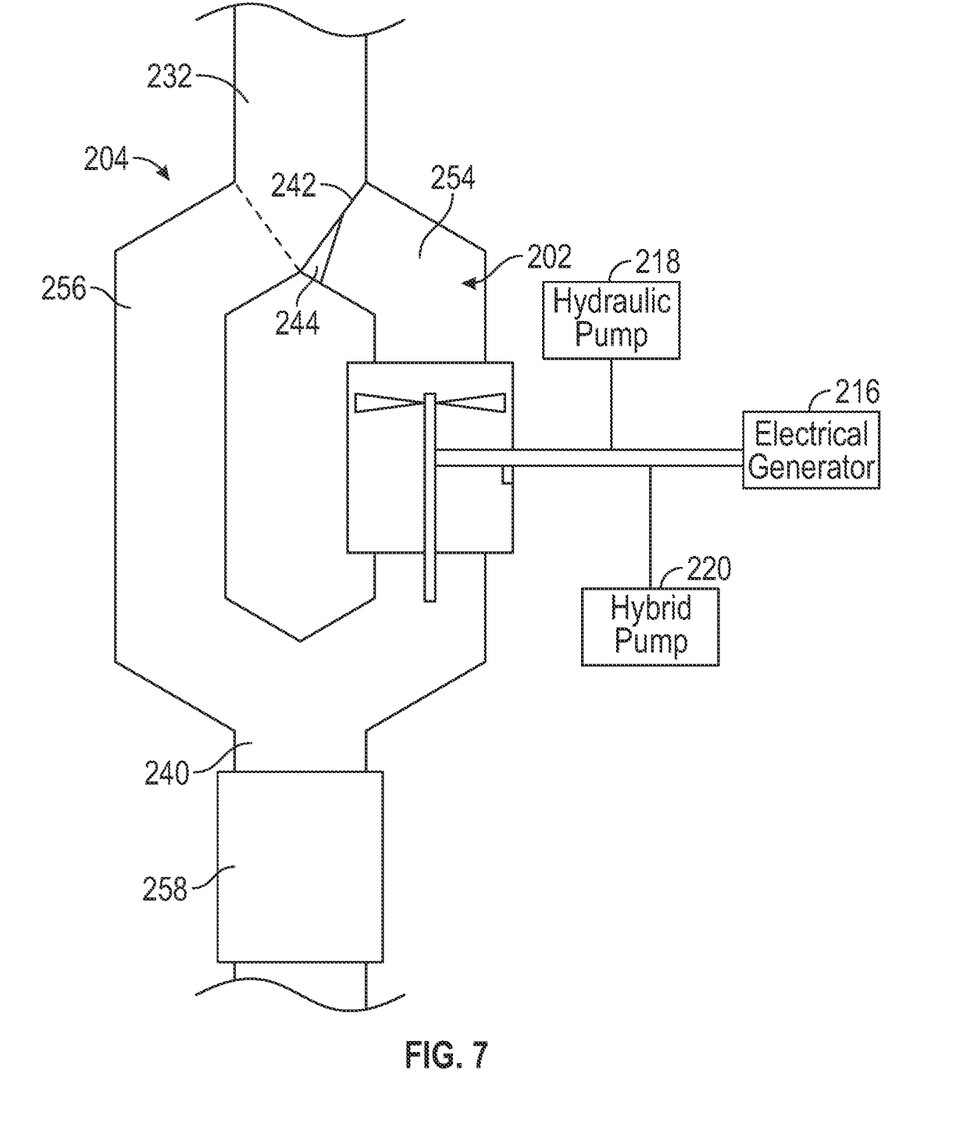
FIG. 7 is another schematic illustration of an embodiment of a ducted supplemental power unit having multiple duct legs.

Another embodiment is illustrated in FIG. 7, which also includes the first duct leg 254 and the second duct leg 256. In this embodiment, the additional ram air device 258 is disposed in the outlet duct 240 such that the RAM airflow 214 that is directed through the ram air turbine 202 in the first duct leg 254 also passes through the additional ram air device 258 after passing through the ram air turbine 202.

While one ram air turbine 202 is illustrated and described herein, one skilled in the art will readily appreciate that multiple ram air turbine 202 arrangements described herein may be utilized in an aircraft 100, creating independent, separate power buses for to distribute electrical power through the aircraft 100. Using multiple ram air turbine 202 arrangements provides redundancy and an extra degree of safety margin to the aircraft 100.

Utilization of the ram air turbine 202 arrangements described herein improves the safety of aircraft ground crews by removing the high force springs required for traditional RAT deployment. Because the ram air turbine 202 is located in the duct 204, the airflow over the wing or fuselage is not disturbed by deployment of the ram air turbine 202, and turbine blade 208 geometry is not restricted by the need to fold and stow the ram air turbine 202. Additionally, the number of blades 208 can be increased over the traditional two blades, increasing the torque to the shaft and thus allowing for a reduction in the overall diameter of the ram air turbine 202 to achieve the same power generation, compared to a traditional RAT.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A supplemental power generation arrangement for an aircraft:
    a duct defined in the aircraft;
    a ram air turbine disposed in the duct and configured to rotate about a turbine axis by a ram airflow through the duct;
    one or more accessory components operably connected to the ram air turbine, the ram air turbine configured to provide rotational energy to power the one or more accessory components;
    wherein the duct includes:
        two or more duct legs disposed in a fluidly parallel arrangement;
        a common inlet duct fluidly connected to and located upstream of the two or more duct legs;
        wherein the ram air turbine is disposed in a first duct leg of the two or more duct legs.

2. The supplemental power generation arrangement of claim 1, further comprising a door extending across a duct inlet of the duct, the door selectably movable between a closed position and an open position to control the ram airflow entering the duct.

3. The supplemental power generation arrangement of claim 2, further comprising an electric latch configured such that a loss of electrical power to the latch allows the door to move from the closed position to the open position.

4. The supplemental power generation arrangement of claim 1, wherein the duct includes one or more of:
    a converging inlet duct disposed upstream of the ram air turbine; and
    a diverging outlet duct disposed downstream of the ram air turbine.

5. The supplemental power generation arrangement of claim 1, further comprising one or more baffles disposed in the duct to throttle the ram airflow in the duct.

6. The supplemental power generation arrangement of claim 1, further comprising a door extending across a duct inlet of the first duct leg, the door selectably movable between a closed position and an open position to control the ram airflow entering the first duct leg.

7. The supplemental power generation arrangement of claim 1, wherein an additional ram air driven device is disposed in a second duct leg of the two or more duct legs.

8. The supplemental power generation arrangement of claim 1, further comprising a common outlet duct fluidly connected to and located downstream of the two or more duct legs.

9. The supplemental power generation arrangement of claim 8, wherein an additional ram air driven device is disposed in the common outlet duct.

10. The supplemental power generation arrangement of claim 1, wherein the one or more accessory components includes one or more of an electrical generator, a hydraulic pump or a hybrid pump.

11. An aircraft comprising:
    an aircraft body;
    one or more engines to drive flight and power the aircraft; and
    a supplemental power generation system, including:
        a duct defined in the aircraft;
        a ram air turbine disposed in the duct and configured to rotate about a turbine axis by a ram airflow through the duct;

one or more accessory components operably connected to the ram air turbine, the ram air turbine configured to provide rotational energy to power the one or more accessory components;

wherein the duct includes:

two or more duct legs disposed in a fluidly parallel arrangement;

a common inlet duct fluidly connected to and located upstream of the two or more duct legs;

wherein the ram air turbine is disposed in a first duct leg of the two or more duct legs.

12. The aircraft of claim 11, further comprising a door extending across a duct inlet of the duct, the door selectably movable between a closed position and an open position to control the ram airflow entering the duct.

13. The aircraft of claim 12, further comprising an electric latch configured such that a loss of electrical power to the latch allows the door to move from the closed position to the open position.

14. The aircraft of claim 11, wherein the duct includes one or more of:

a converging inlet duct disposed upstream of the ram air turbine; and a diverging outlet duct disposed downstream of the ram air turbine.

15. The aircraft of claim 11, further comprising one or more baffles disposed in the duct to throttle the ram airflow in the duct.

16. The aircraft of claim 11, wherein an additional ram air driven device is disposed in a second duct leg of the two or more duct legs.

17. The aircraft of claim 11, further comprising a common outlet duct fluidly connected to and located downstream of the two or more duct legs.

18. The aircraft of claim 17, wherein an additional ram air driven device is disposed in the common outlet duct.

* * * * *